A. N. PARRAN.
INSTRUCTION DEVICE.
APPLICATION FILED SEPT. 25, 1920.

1,370,607.

Patented Mar. 8, 1921.

UNITED STATES PATENT OFFICE.

ALICE N. PARRAN, OF BALTIMORE, MARYLAND.

INSTRUCTION DEVICE.

1,370,607.   Specification of Letters Patent.   Patented Mar. 8, 1921.

Application filed September 25, 1920. Serial No. 412,771.

*To all whom it may concern:*

Be it known that I, ALICE N. PARRAN, a citizen of the United States of America, residing in the city of Baltimore, State of Maryland, have invented certain new and useful Improvements in Instruction Devices, of which the following is a specification.

The use by department stores and the like of sales checks to be filled out with the essential data, relating to sales to each individual customer, is universal, and the appearance of these checks is, in a general way, familiar to almost everybody.

While these checks bear a general resemblance to each other, there are more or less unimportant differences between the forms of checks used by department stores. The use of these checks involves one difficulty which is common to all; this is due to the fact that the checks made out in connection with purchases involve a considerable variety of different combinations of data, which make up the finished check, and as the employees using these checks are not, as a rule, of a high mental attainment, most explicit instruction is essential and reference to sample checks filled out in the various forms is frequently necessary to determine the procedure where the circumstances encountered are at all unusual or for some reason, unfamiliar.

The use of instruction books, having a number of sample checks, which resemble those being filled out, is well known, but this has not proved satisfactory because, as thus arranged, the different forms are difficult of comparison, and the employee seeking information, finds it hard to locate the form which fits the circumstances of the case being considered and reference to a text book under such circumstances is not convenient or practicable.

The present invention provides an instruction device by means of which this difficulty is reduced or eliminated. The invention relates to the provision in connection with the usual or any preferred form of check book of one or more instruction sheets of substantially the same size as the individual pages and preferably punched or otherwise adapted to be combined with these pages, the instruction sheets or pages bearing each, a number of fac-similes of checks so reduced and arranged that several of them, four in the present instance, are combined on a single page of the size of the original checks, so that the various forms can be accommodated on two sides of a single sheet or at the most, on two sheets, making them conveniently accessible to the employee using the check book and easily compared for the purpose of selecting the form which it is desired to prepare in the particular instance in point.

In the accompanying drawing, I have illustrated a check book with instruction sheets combined and arranged in accordance with my invention in its preferred form.

Figure 1:
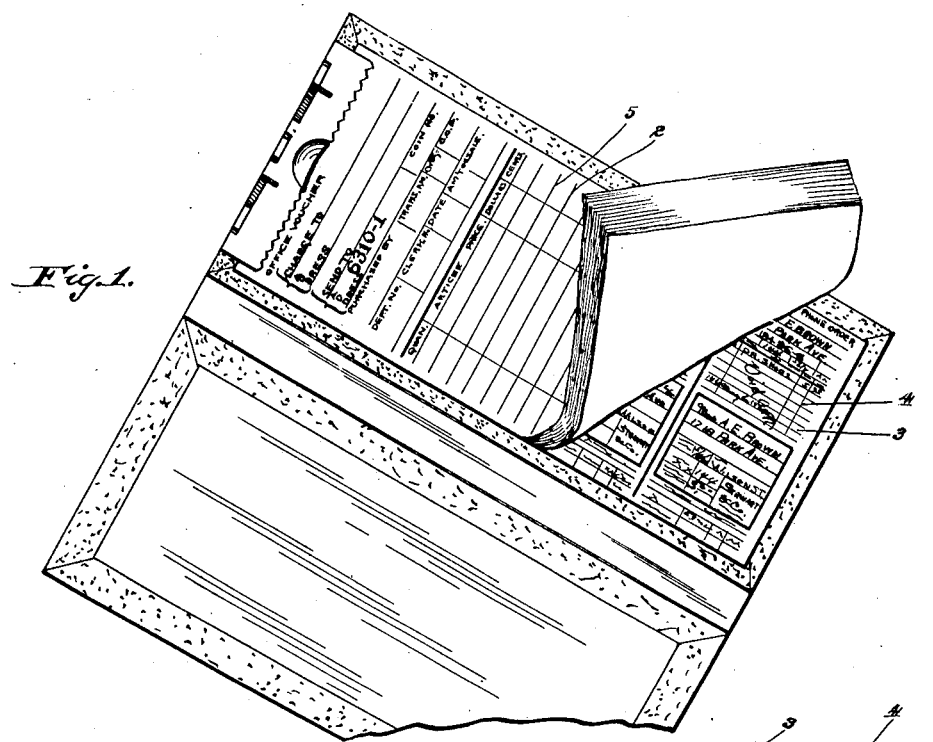
Figure 1 is a view of the book, showing the original check blanks and the instruction sheets combined.
Figure 2:
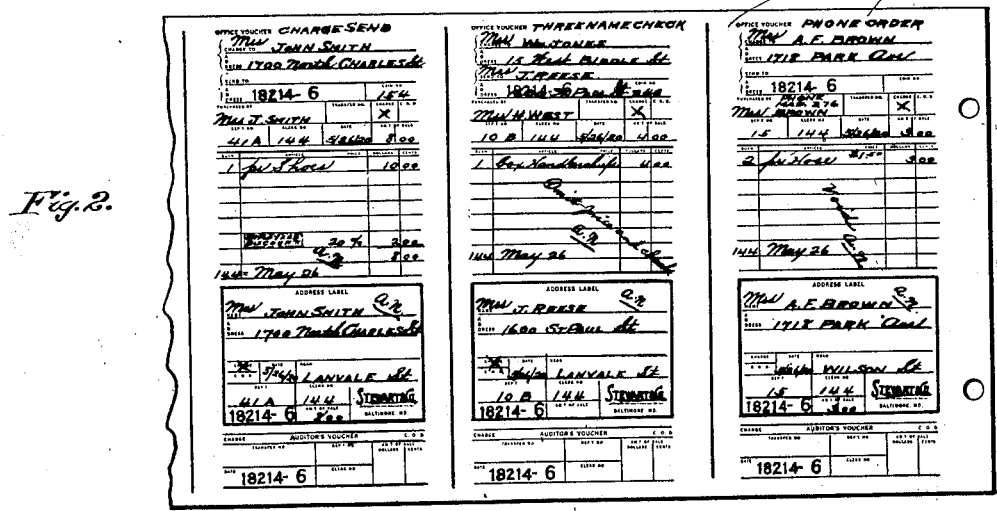
Fig. 2 is a detail view of one side of one instruction sheet, part of which is broken away for convenience in illustration.

Referring to the drawings by numerals:

The device consists of the usual or any preferred form of check book, having blanks, 2, for original and duplicate checks and at the back instruction sheets, 3, bearing fac-similes, 4, of the original checks printed thereon made out in the various forms necessary to the conduct of the business.

By examination of Fig. 1, it will be noted that the original checks are elongated in a direction transverse to the lines, 5, on which the writing is placed. The reduced fac-similes, 4, are, it will be noted, of substantially similar shape and proportions but the long dimension of the fac-similes is placed cross-wise of the page, making it convenient to group a number of checks on a single page without reducing them sufficiently to make the writing illegible; also placing them side by side adds to the degree of convenience with which they may be compared, facilitating selection of the desired form.

I have thus described specifically and in detail a check book with instruction sheets combined and arranged in accordance with my invention in order that the nature and operation of same may be clearly understood, however, the specific terms herein are used descriptively rather than in a limiting sense, the scope of the invention being defined in the claims.

What I claim and desire to secure by Letters Patents, is:

1. A sales check book having check blanks and including an instruction sheet of substantially the same size as the check blanks, the instruction sheet having produced thereon a plurality of fac-similes of completed checks, made out in the various forms arising in the course of business and arranged for convenience in comparison and selection of the desired form.

2. A sales check book having in combination check blanks adapted to be filled out as sales checks and an instruction sheet of substantially the same size as the check blanks, the instruction sheet having thereon a plurality of fac-similes of checks arranged side by side in transverse relation to the full sized check blanks, said fac-similes being illustrative of the various forms of checks required in the course of business.

Signed by me at Baltimore, Maryland, this 23rd day of September, 1920.

ALICE N. PARRAN.

Witnesses:
PORTER H. FLAUTT,
ANNA BERNSTEIN.